United States Patent [19]

Pitts

[11] Patent Number: 4,463,365

[45] Date of Patent: Jul. 31, 1984

[54] ELECTROSENSITIVE PRINTING TECHNIQUE

[75] Inventor: Warren R. Pitts, Needham, Mass.

[73] Assignee: Dennison Manufacturing Company, Framingham, Mass.

[21] Appl. No.: 383,675

[22] Filed: Jun. 1, 1982

[51] Int. Cl.³ .............................................. G01D 15/08
[52] U.S. Cl. ...................................................... 346/163
[58] Field of Search ............... 101/DIG. 13; 346/156, 346/155, 162-165

[56] References Cited

U.S. PATENT DOCUMENTS 3,091,767 5/1963 Kinsella .............................. 346/156
3,626,422 12/1971 Lloyd .................................. 346/155
3,946,400 3/1976 Buro .................................... 346/165
3,956,755 5/1976 Takahasi et al. .................... 346/155
4,104,648 8/1978 Blumenthal et al. ............... 346/163

FOREIGN PATENT DOCUMENTS 710441 6/1954 United Kingdom .

*Primary Examiner*—Thomas H. Tarcza
*Attorney, Agent, or Firm*—Arthur B. Moore

[57] ABSTRACT

Apparatus for the integral imprinting of indicia on electrosensitive substrates, including substrates subdivided into electrically discontinuous regions such as die cut labels. A negative voltage is supplied to a print electrode configured in the shape of a given character or symbol, and the print electrode is disposed over the metalized surface of an electrosensitive substrate while a grounding member contacts the surface nearby. Preferably, the printer includes a grounding member or plurality of grounding members which are arrayed to assure continuous current flow between the print and ground electrodes.

8 Claims, 14 Drawing Figures

ELECTROSENSITIVE PRINTING TECHNIQUE

BACKGROUND OF THE INVENTION

The present invention relates to the imprinting of electrosensitive substrates, and more particularly to improved electrosensitive printing apparatus.

Electrosensitive papers are widely used as a printing substrate, with the advantages of high printing speeds at reasonable costs. Such substrates are typically composed of an electroconductive paper with a thin metallic overcoat. Printing occurs when a stylus bearing a desired image is brought into contact with the metallic surface layer, and a potential difference is applied between the stylus and a grounded member contacting a nearby portion of the conducting substrate. The resulting current flow is largely converted into heat at the vicinity of the stylus, resulting in the melting of the metallic layer and patterned exposure of the differently colored underlayer.

Printers used in this process have typically included a row of point stylii, with a web of electrosensitive material moving in a direction transverse to the row. By controlling the row and column printing location, such a printer creates alphanumeric characters using a dot matrix printing technique. Characters and symbols thus printed are limited in shape and resolution by the configuration of the matrix. Such technique also imposes limitations on printing speeds.

A particular problem in electrosensitive printing occurs in the imprinting of label stock and similar, die cut substrates. If the printing member and the ground electrode contact the substrate surface on opposite sides of a die cut segment, the current path between the two will be interrupted, and printing will not occur.

Accordingly, it is one object of the invention to provide fast, effective electrosensitive printing of alphanumeric characters and other symbols. A related object is flexibility in the size, shape and density of the electroprinted image. It is a further related object to avoid the limitations of point matrix printing.

Another object of the invention is the extension of electrosensitive printing to labels and other die cut substrates. A related object is the achievement of electrosensitive printing apparatus which will continuously provide a current path between the print and ground electrodes.

SUMMARY OF THE INVENTION

In accomplishing the above and related objects, the invention provides for the integral printing of characters using print electrodes configured in the shape of entire characters or symbols. For imprinting die cut electrosensitive substrates, the invention provides a grounding member or plurality of grounding electrodes which are designed to ensure a continuous current path to the print electrodes.

In accordance with one aspect of the invention, an electrosensitive printing device includes a set of print electrodes, wherein each print electrode corresponds to a member of a set of characters or symbols. In accordance with a related aspect of the invention, an individual print electrode is configured to integrally print a desired character or symbol in a chosen font and image texture. The entire character is imprinted simultaneously on an electrosensitive substrate when the print electrode is disposed over the substrate's metalized surface and a potential difference is applied between the print electrode and a nearby grounding member or members.

In accordance with another aspect of the invention, the integral printing principle may be implemented in a wide variety of devices. Such devices include a metalized daisy wheel printer with figures protruding at the periphery of the wheel; the print head of a typewriter or teletype; the printing member of a scientific recording device with visual output, and any other printing member which is conductive or may be given a conductive surface. The print electrode face may comprise a flat surface all portions of which simultaneously contact the electrosensitive substrate, or alternatively curved surface portions of which successively contact the substrate to create the electrosensitive impression.

In accordance with a preferred embodiment of the invention, a plurality of ground electrodes may be provided for each print electrode for the imprinting of die cut substrates such as label stock. The ground electrodes are placed relative to the corresponding print electrodes so that at least one ground electrode will be located within the same zone of electrosensitive substrate as the print electrodes. In the case of imprinting of metalized label stock, this entails a separation of the ground electrodes by less than the length of a label.

In an alternative embodiment of the invention, multiple ground electrodes are mounted so as to be raised and lowered to positions of contact with the metalized substrate surface. In this embodiment, at least one ground electrode should contact a zone within the metalized surface while the corresponding print electrodes are activated and disposed over the zone. This arrangement would typify the imprinting of an electrosensitive substrate using a rotary print device, for example.

In yet another embodiment of the invention, the grounding members comprise continuous belt or band electrodes, which contact portions of the electrosensitive labels or zones which are not to be imprinted.

BRIEF DESCRIPTION OF THE DRAWINGS

The above and additional aspects of the invention are illustrated in the detailed description which follows, taken in conjunction with the drawings in which.

DETAILED DESCRIPTION

Reference should now be had to FIGS. 1 through 8B for a detailed description of the electrosensitive technique of the invention.

Figure 1A:
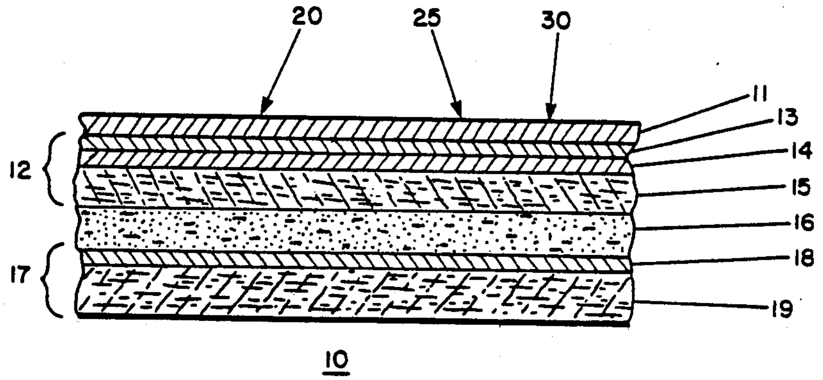
FIG. 1A PRIOR ART
FIG. 1A is a partial cross sectional view of an electrosensitive substrate.

The partial sectional view of FIG. 1A shows the various layers of an illustrative electrosensitive substrate 10 in accordance with the prior art. The substrate 10 includes a release sheet 17, a pressure-sensitive adhesive layer 16, electrosensitive paper 12, and a thin metallic overcoat 11 (such as aluminum). The electrosensitive paper 12 in turn comprises an electroconductive base material 15, a tie coat 14, and a colored lacquer coating 13. Indicia are produced in substrate 20 by selectively vaporizing metallic layer 11 to expose colored layer 13.

Figure 1B:
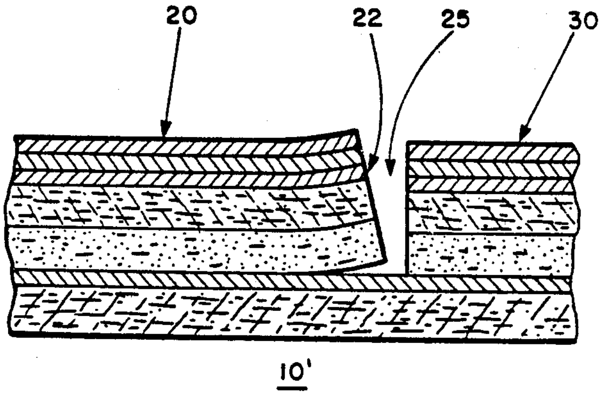
FIG. 1B is a view of the substrate of FIG. 1A, die cut to form label stock, with the label partially removed.

As shown in FIG. 1B, the electrosensitive substrate 20 may be die cut in order to form label stock 10'. Label stock 10' includes a label 20 and a label border strip 30 adhering to a release sheet 17, with a gap 25 separating the label from the label border strip. A label 20 is removed from the release sheet 17 by peeling the label, including pressure-sensitive adhesive 16, from the release surface 18. To minimize the risk of delamination of the label 20, and avoid a jagged edge 22 of the separated label, it is advisable to precut a pronounced gap 25 between label 20 and label border strip 30. To the extent that the gap 25 is interrupted by regions of contact between label 20 and border strip 30, the above label removal problems will be increased.

Figure 2A:
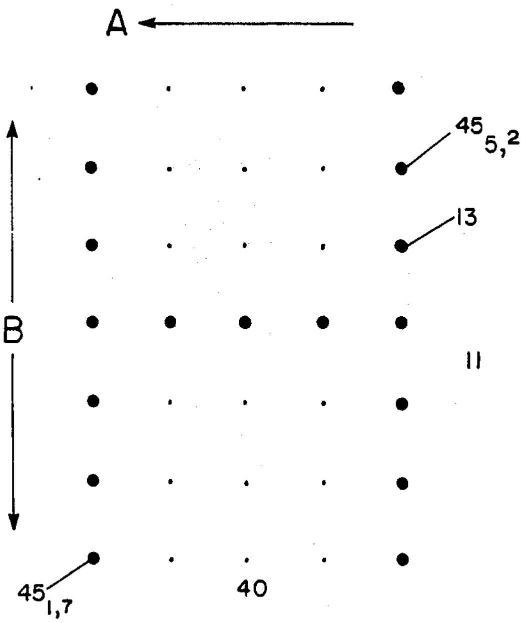
FIG. 2A PRIOR ART
FIG. 2A is a prior art view of the matrix character 'H' formed by electrosensitive printing.

The heretofore prevalent method of imprinting an electrosensitive substrate 20 involves the creation of an array of image components to form a matrix approximation of the desired image. FIG. 2A gives a plan view of a 5×7 matrix character 'H' formed by this method. A web of electrosensitive material 20 moves in direction A relative to a matrix printer (not shown). The printer includes a column of dot shaped print electrodes aligned in direction B. To form a point $45_{ab}$ of the character 40, the print signal is given for an electrode at vertical position b when the print electrode column is over horizontal location a, melting the metallic surface layer 11 to expose to colored underlayer 13. Columns 1 through 5 of the character 'H' must be printed successively in this method.

Figure 2B:
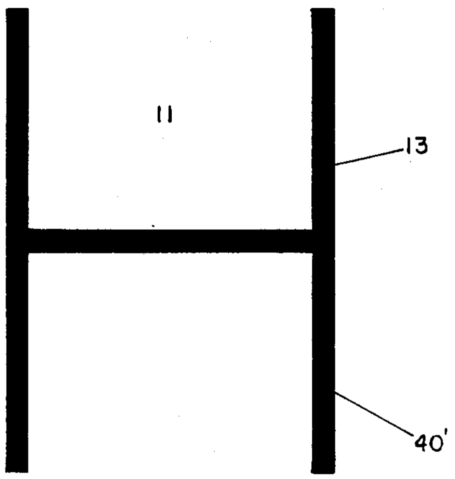
FIG. 2B is a plan view of an integrally formed character 'H' formed by the electrosensitive printing technique of the invention.

FIG. 2B illustrates a character 'H' as imprinted in accordance with the invention. Instead of an aggregation of image components formed by point electrodes, the present method prescribes an integrally printed character 40'. The point electrodes are replaced by electrodes with profiles of characters and symbols in a desired font. Upon application of a print signal to an electrode of a given configuration, a symbol of essentially identical configuration and dimensions is formed by a patterned melting of the metallic surface material 11. This process has the advantages of immediate formation of the entire character as compared with matrix printing. In the case of a print stylus configured in a flat surface as a character or symbol such as illustrated in FIG. 2B, care should be taken to ensure firm contact of all portions of the stylus with the metallic surface material 11. Alternatively, the print stylus may have a curved surface such as a character mounted on a rotary print wheel. In this instance, portions of the print stylus will successively contact the metalized substrate to create the entire impression.

The above process permits electrosensitive printing at considerably faster character per second rates than existing matrix printers. In addition, the print electrodes may be designed in a variety of fonts and image textures. The integral printing method may be implemented by means of numerous existing types of apparatus for electrically or mechanically presenting a character template to a printing surface. These and additional advantages are illustrated in the following nonlimiting examples:

EXAMPLE I

Figure 3:
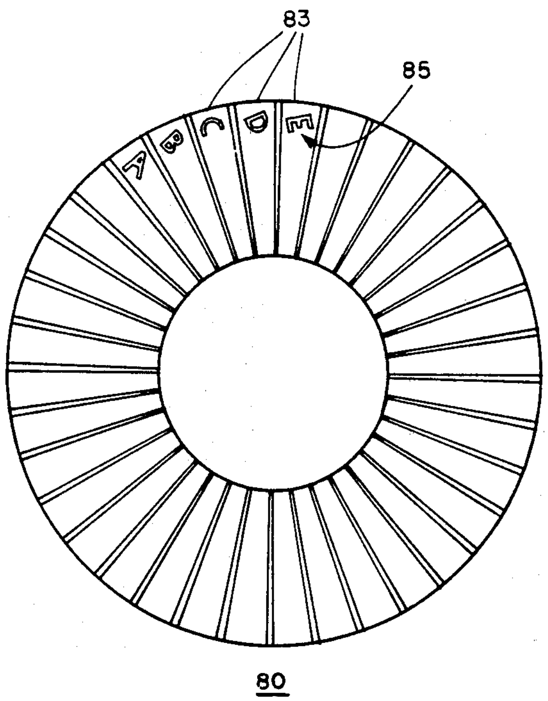
FIG. 3 is a plan view of a daisy wheel-type print head in accordance with one embodiment of the invention.

FIG. 3 shows a daisy wheel-type imprinting device. The daisy wheel 80 includes a multiplicity of radial print fingers 83, each including in relief an alphanumeric character or symbol 85. The daisy wheel is entirely copper plated in order to provide the necessary electrical properties for imprinting electrosensitive substrates, and is suited to incorporation in a hand-held printing device.

EXAMPLE II

A typewriter containing no ink ribbon, for imprinting of electrosensitive metalized papers, requires only minor modifications of an existing electrical typewriter of the variety including a spherical typing head, such as that sold by the International Business Machines Corporation under the trademark "Selectric". The modified typewriter includes grounding rollers which contact the paper near the typing area. The metallic typing head is maintained at −30 volts DC and a current of 50 mA is supplied.

EXAMPLE III

Figure 4:
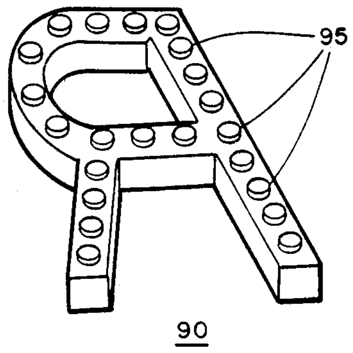
FIG. 4 is a perspective view of a print electrode for the character 'R' in accordance with an alternative embodiment of the invention.

The appearance of a matrix printed character may be achieved using the integral printing method of the invention. FIG. 4 is a plan view of a print electrode 90 for the letter R, designed to create the texture of a dot matrix character. The electrode 90 includes projections 95 of the requisite shape and size. Similarly, the contours of a character may conform to a standard machinereadable font, such as OCRA or OCRB.

Figure 5:
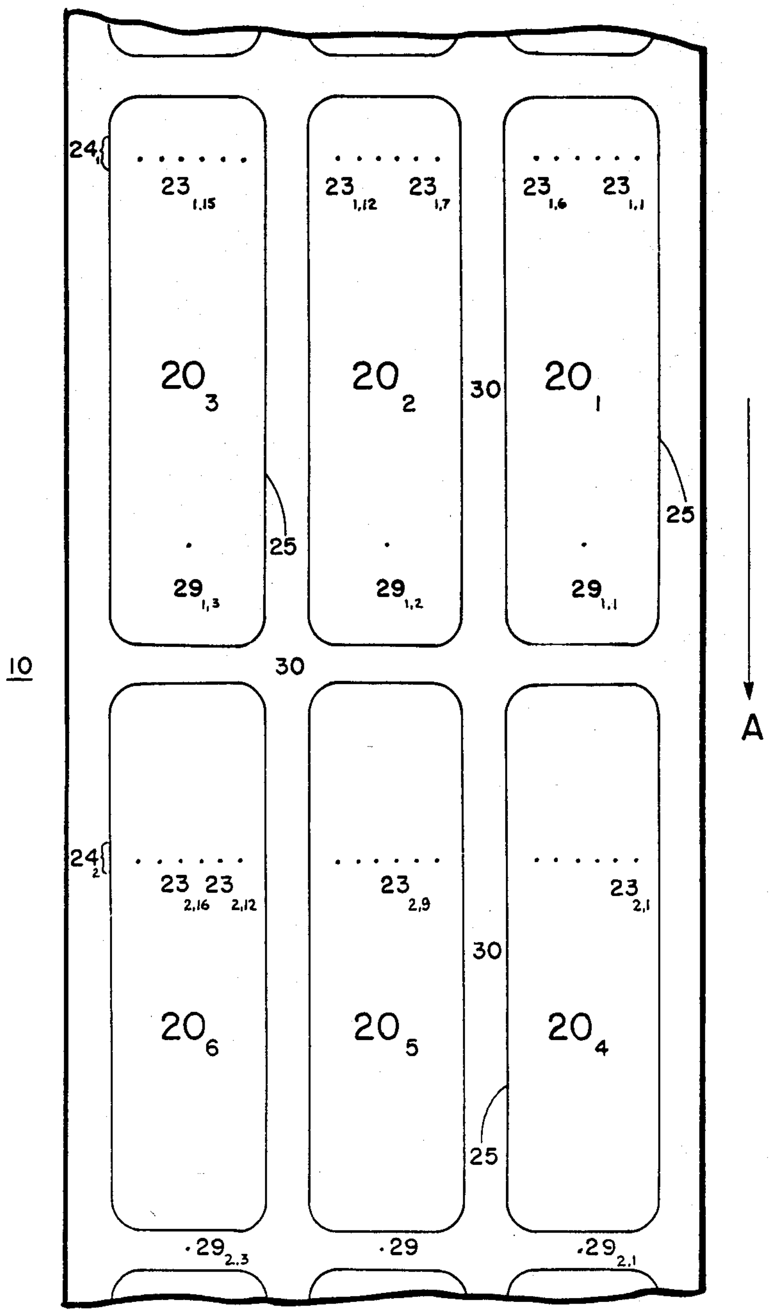
FIG. 5 PRIOR ART
FIG. 5 is a partial plan view of electrosensitive label stock as seen in the prior art.

FIG. 5 illustrates a problem that occurs in imprinting label stock or other die cut substrates using prior art electrosensitive printers. A label strip 10 illustratively comprises a 3×N array of labels 20, separated by a border strip 30. As label stock 10 moves through an imprinter in direction A, a row of conducting stylii bearing desired indicia contacts three adjacent labels, while a metal roller contacts label strip 20 at a nearby location. For proper imprinting of labels, there must be an uninterrupted current path between the point of contact of the given stylus, at potential V, and the grounded metal roller.

With reference to FIG. 5 when the imprinting stylii are at row $24_1$, a grounded roller contacts the label $20_2$ at point $29_{1,2}$. A current path exists between the stylus $23_{1,7}$ and roller $29_{1,2}$, both located within label $20_2$. When the stylus row is at location $24_2$, however, the stylii are located within labels $20_4$, $20_5$, and $20_6$, while the grounded rollers contact label border strip 30. In this particular printing configuration, the essential current flow is interrupted by the gap 25 between the labels 20 and border strip 30.

Figure 6A:
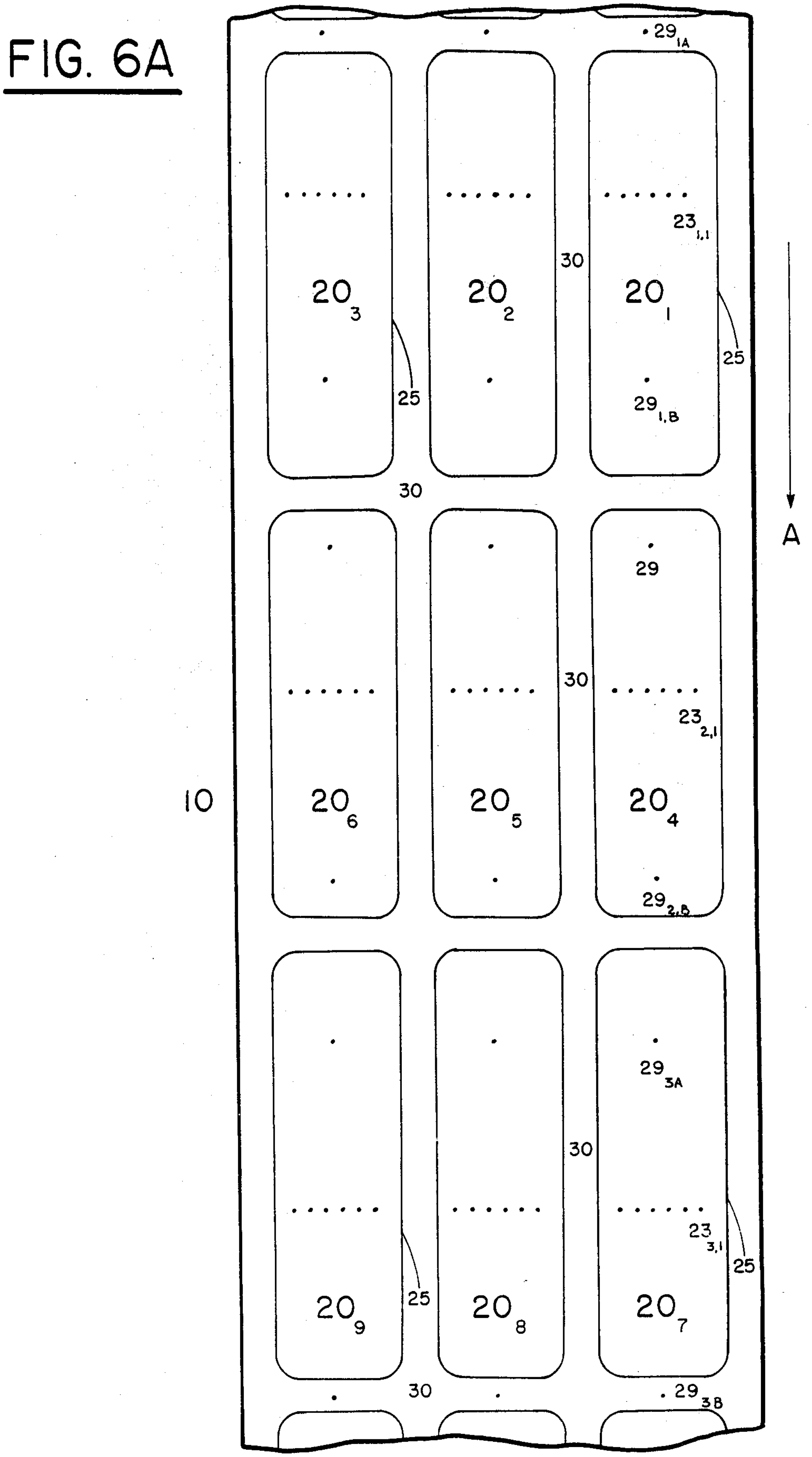
FIG. 6A is a partial plan view of electrosensitive label stock showing various positions of the print head of FIGS. 6B, 6C.

The problem of maintaining an uninterrupted current path gives rise to another feature of the invention. This feature in one embodiment provides a plurality of ground electrodes for every set of print electrodes, with advantages illustrated in FIG. 6A. FIG. 6A shows a section of metalized label stock 10' identical with that of FIG. 5. Instead of a single ground electrode $\mathbf{29}_1$ for print electrodes $\mathbf{23}_{1-6}$, however, the printer configuration calls for two ground electrodes, $\mathbf{29}_{1A}$, and $\mathbf{29}_{1B}$. Ground electrode $\mathbf{29}_{1A}$ is located upstream of the print electrodes $\mathbf{23}_1$, while ground electrode $\mathbf{29}_{1B}$ is illustratively located an equal distance downstream of the print electrodes. Ground electrodes $\mathbf{29}_{1A}$ and $\mathbf{29}_{1B}$ are separated by a distance d which is somewhat less than the length 1 of a label 20.

FIG. 6A shows three possible dispositions of a set of print and ground electrodes with respect to a label to be imprinted. Print electrodes $\mathbf{23}_1$ have passed significantly less than half the distance into labels $\mathbf{20}_1$, $\mathbf{20}_2$, and $\mathbf{20}_3$. In this position, ground electrodes $\mathbf{29}_{1B}$ lie within the labels while ground electrodes $\mathbf{29}_{1A}$ lie outside the labels. Thus, a current path exists between the print electrodes and the leading ground electrodes $\mathbf{29}_{1B}$. Print electrodes $\mathbf{23}_2$ are approximately centered in labels $\mathbf{20}_4$, $\mathbf{20}_5$, and $\mathbf{20}_6$, and trailing ground electrodes $\mathbf{29}_{2B}$ have passed into the labels so that both sets of ground electrodes (which are separated by less than the length of a label) lie within the labels, providing alternative current paths for electroprinting. Print electrodes $\mathbf{23}_3$ have passed significantly more than half way through labels $\mathbf{20}_7$, $\mathbf{20}_8$, and $\mathbf{20}_9$, whereby leading ground electrodes $\mathbf{29}_{3B}$ lie outside of the labels while trailing ground electrodes $\mathbf{29}_{3A}$ remain within. Thus, this arrangement assures a continuous current path between the print and ground electrodes.

Figure 6B:
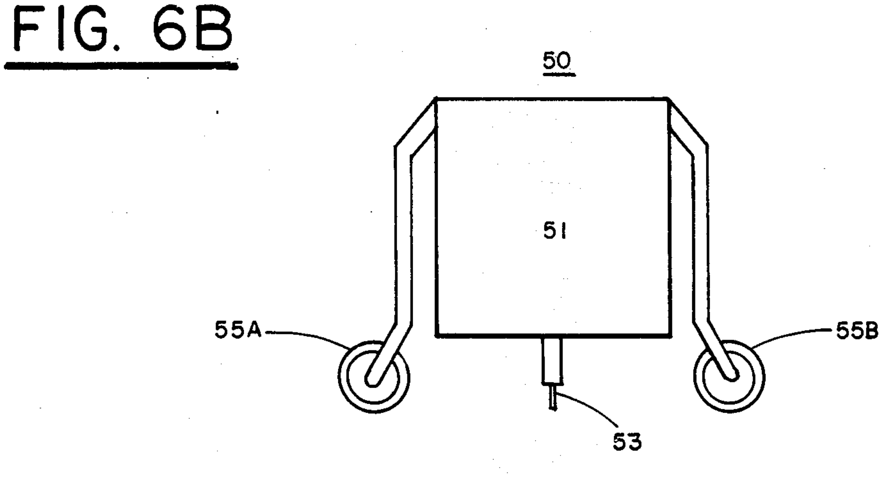
FIG. 6B is a side view of an electrosensitive print head including two ground electrodes in a preferred embodiment of the invention.
Figure 6C:
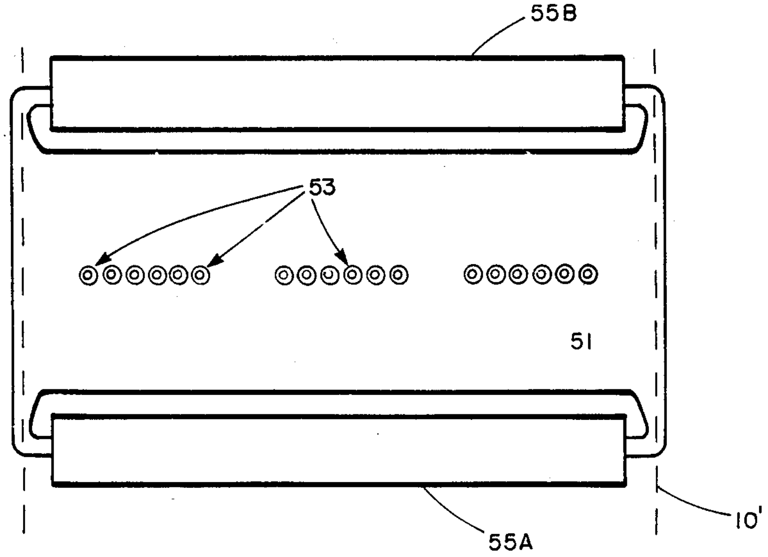
FIG. 6C is a bottom plan view of the print head of FIG. 6B.

FIGS. 6B and 6C are simplified views of the imprinting apparatus incorporating two grounding rollers and a conventional matrix print electrode row. As seen from the side in FIG. 6B, the print head unit 50 includes a set of dot matrix print electrodes 53, straddled by grounding rollers 55*a* and 55*b*. As can be seen in the bottom plan view of FIG. 6C, grounding rollers 55*a* and 55*b* may run the width of the electrosensitive web 10', along with a row of point electrodes $\mathbf{53}_1$, $\mathbf{53}_2$, etc.

Figure 7A:
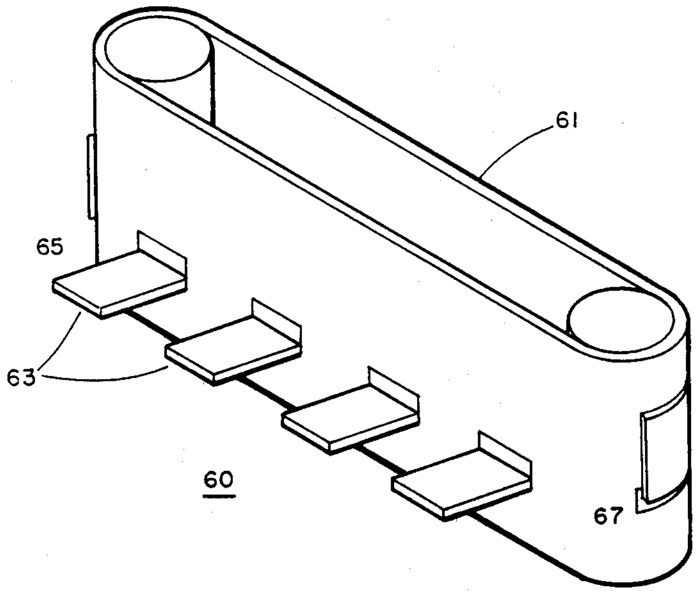
FIG. 7A is a side plan view of a print head including an alternative ground electrode embodiment.
Figure 7B:
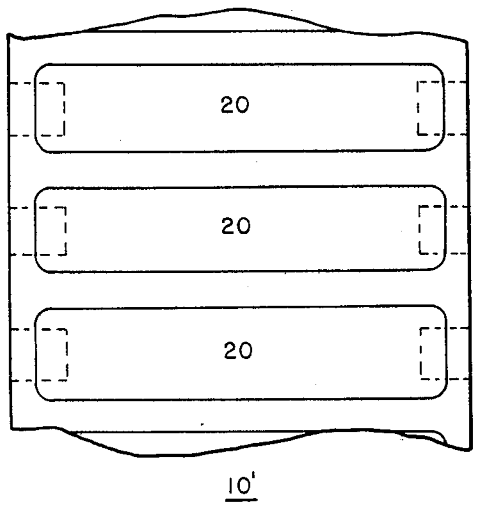
FIG. 7B is a partial plan view of electrosensitive label stock as imprinted by the printer of FIG. 7A.

In alternative embodiments of the invention, a continuous current flow between the ground and print electrode is assured by the use of ground electrodes which are designed to remain in constant contact with die cut regions of the substrate. FIG. 7 illustrates one such grounding device 60 for the imparting of die cut substrates. The printer 60 includes a continuous metal band 61 which bears a series of finger-type ground electrodes 63. These ground electrodes are spaced at a separation corresponding to the spacing of labels on an illustrative label strip 10'. The labels are printed on a flat surface, and finger electrodes 63 are clamped down on the edges of labels 20 at a point 65, remain down during imprinting, and are raised at a further point 67. As shown in FIG. 7B, the areas of contact for finger electrodes 63 are intended to remain free of indicia.

The normal sequence of events in the imprinting of electrosensitive substrates is for the print and ground electrodes to be applied to the substrate, and then for a negative voltage point signal to be applied to the appropriate print electrodes. This will result in displacement of the metalized surface at the print electrodes but not at the ground electrodes. In the case in which an actuated print electrode is applied to the substrate, and a ground electrode substantially contacts the substrate, however, the metalized surface will be displaced at the ground electrode. In the embodiment of FIG. 7A, ground electrodes 83 may be raised and lowered into and out of contact with the substrate 10. In this embodiment, it is important that at least one ground electrode contact a given area of the substrate while the corresponding print electrodes are actuated and disposed over that area. It is for this reason, as well, that it is desirable in the embodiment of FIGS. 6A–C to separate ground electrodes 29 by less than the distance of a label, to avoid a hiatus between the periods of contacting a given label by the leading and trailing ground electrodes.

Figure 8A:
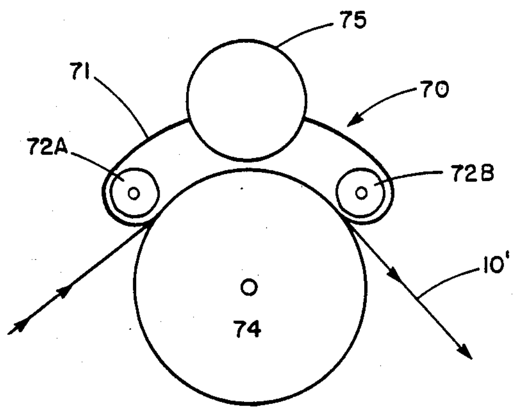
FIG. 8A is a side plan view of a print head including a second alternative ground electrode embodiment.
Figure 8B:
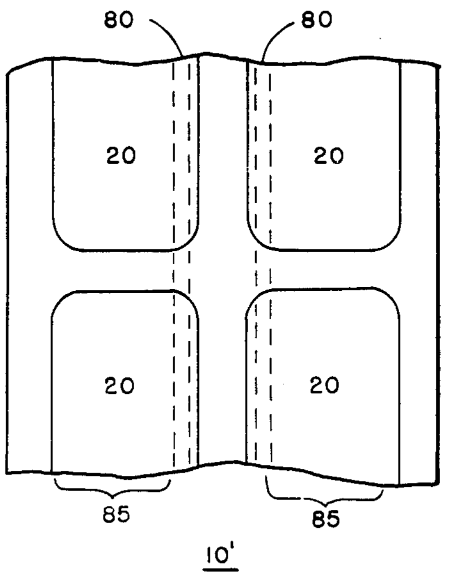
FIG. 8B is a partial plan view of electrosensitive label stock as imprinted by the printer of FIG. 8A.

FIG. 8A shows in perspective a belt-type grounding device 70 to be utilized in conjunction with a rotary print wheel 75. The grounding device 70 comprises a continuous metal band electrode 71 which is mounted on two spring-loaded rollers 72A and 72B so as to be impressed against a web of electrosensitive material 10' which is fed over roller 74 for imprinting. One or more integral character print wheels 75 are disposed over the balance of electrosensitive substrate 10'. As seen in the plan view of FIG. 8B, the grounding band 71 contacts a print-free zone 80 at the edge of each label 20, leaving the balance 85 of the label free for imprinting by print wheels 75.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

I claim:

1. Improved apparatus for imprinting electrosensitive metalized label stock having a plurality of electrically isolated labels, of the type including a conductive printing member which is disposed near the metalized surface, grounding means which contact the metalized surface nearby, and means for applying a print voltage between the printing member and the grounding means to actuate the printing member and cause removal of the metalized surface in the vicinity of the printing member, wherein the improvement comprises improved grounding means comprising:

a pair of ground electrodes forming an integral assembly with said printing member, wherein said ground electrodes straddle a printing member in a direction of relative motion between the metalized labels and the printing apparatus, and are separated by less than the dimension of labels in this direction.

2. Improved apparatus for imprinting the electrosensitive metalized substrates which have been subdivided into electrically isolated zones, of the type including a conductive printing member which is disposed near the metalized surface of an electrosensitive substrate, grounding means which contact the metalized surface nearby, and means for applying a print voltage between the printing member and grounding means to actuate the printing member and cause removal of the metalized surface in the vicinity of the printing member, wherein the improvement comprises improved grounding means comprising:

a plurality of grounding finger electrodes, and means for clamping the finger electrodes to the electrosensitive metalized substrate so that at least one finger electrode contacts any electrically isolated zone over which an actuated printing member is disposed, whereby the grounding fingers move in conjunction with the electrosensitive metalized substrate.

3. Improved apparatus for imprinting electrosensitive metalized substrates which have been subdivided into electrically isolated zones, of the type including a conductive printing member which is disposed near the metalized surface of an electrosensitive substrate, grounding means which contact the metalized surface nearby, and means for applying a print voltage between the printing member and grounding means to actuate the printing member and cause removal of the metalized surface in the vicinity of the printing member, wherein the improvement comprises improved grounding means comprising:

a plurality of continuous metal bands each of which contacts a series of electrically isolated zones of the electrosensitive metalized substrate, wherein at least one of said continuous metal bands contacts any electrically isolated zone over which an actuated printing member is disposed.

4. Improved apparatus for imprinting electrosensitive metalized substrates which have been subdivided into electrically isolated zones, of the type including a conductive printing member which is disposed near the metalized surface of an electrosensitive substrate, grounding means which contact the metalized surface nearby, and means for applying a print voltage between the printing member and grounding means to actuate the printing member and cause removal of the metalized surface in the vicinity of the printing member, wherein the improvement comprises improved grounding means comprising:

a plurality of grounding electrodes, and means for applying the grounding electrodes to the electrosensitive metalized substrate so that at least one grounding electrode contacts any electrically isolated zone over which an actuated printing member is disposed.

5. Apparatus as defined in claim 4 wherein the printing member and grounding means comprise an integral assembly which is movable relative to the electrosensitive metalized substrate, and the grounding means comprises a pair of grounding electrodes which straddle the printing member in the direction of relative motion.

6. Apparatus as defined in claim 5 wherein the electrically isolated zones comprise electrosensitive metalized labels, and wherein the two ground electrodes are separated by less than the dimension of labels in the direction of relative motion.

7. Apparatus as defined in claim 4 wherein the grounding means comprises a separate assembly from the printing member, including a series of finger electrodes, and means for clamping said finger electrodes to the electrically isolated zones, wherein the grounding means moves in conjunction with the electrosensitive metalized substrate.

8. Apparatus as defined in claim 4 wherein the grounding means comprises a plurality of continuous metal bands each of which contacts a series of electrically isolated zones of the electrosensitive metalized substrate.

* * * * *